United States Patent [19]

Nelson

[11] Patent Number: 4,557,222
[45] Date of Patent: Dec. 10, 1985

[54] FORCED HUMID ASPIRATION FOR INTERNAL COMBUSTION ENGINES

[76] Inventor: Herbert A. Nelson, Star Rte., Nathrop, Colo. 81236

[21] Appl. No.: 528,968

[22] Filed: Sep. 2, 1983

[51] Int. Cl.$^4$ ............................................. F02M 25/04
[52] U.S. Cl. ................................ 123/25 B; 123/25 A; 123/25 P; 123/25 L
[58] Field of Search ................... 123/25 R, 25 A, 25 B, 123/25 P, 25 L

[56] References Cited

U.S. PATENT DOCUMENTS

| | | | |
|---|---|---|---|
| 2,769,624 | 11/1956 | Burnside | 123/25 A |
| 3,044,453 | 7/1962 | Hoffmann | 123/25 B |
| 4,027,630 | 6/1977 | Giardini | 123/25 P |
| 4,068,625 | 1/1978 | Brown | 123/25 A |
| 4,208,989 | 6/1980 | Hart | 123/25 B |
| 4,306,519 | 12/1981 | Schoenhard | 123/25 A |

*Primary Examiner*—Ira S. Lazarus

[57] ABSTRACT

This invention is an arrangement of mechanical components that humidify the intake air (specifically, the air that mixes with fuel for combustion) of an internal combustion engine, to increase combustion efficiency and reduce poison gas emissions. The components of this invention consist of a heat collector, air pump, humidifier and ducting tubes that connect the components forming a pressurized circuit of heated, humid air. Part of the embodiment of this invention is in the designed capacities of the components related to the engine to be served. Reasons and guidelines for this are given in the Summary of the Invention. A pressurized circuit to feed the combustion mixture of an engine is the crux of this system's function. It is the means to increase the mixture's density, in all the ranges of power demand by at least the volume of humidity that is introduced into the air stream. Let it be known that principles described herein apply to all internal combustion engines that use fuels of the hydrocarbon groups, such as gasoline, diesel or fuel oil but not to contain any form of alcohol such as gasohol. The research to date has been carried out on gasoline engines and the specific references usually indicate gasoline appliance, but it is not the intention to establish that limitation.

4 Claims, 4 Drawing Figures

FORCED HUMID ASPIRATION FOR INTERNAL COMBUSTION ENGINES

BACKGROUND OF INVENTION

The field of this invention applies generally to all internal combustion engines that harness the expansive force of rapid burning hydrocarbon fuels, converting the force to rotational or thrust propulsion. This invention may be applied to engines of various designs in regard to size and horsepower, two or four cycle and either liquid or aid cooled.

The prior art of adding water to the combustion process dates back to early oil burning tractors and large stationary engines were it was added to smooth out the burning process and give relief to carbon build-up. In more current design, it is used in some jet propulsion as a cooling agent.

It is apparent that water was added to the combustion process for various purposes, which include the steam effect and the hydrogen effect, both of which add force to the expanding, burning gas mass of internal combustion. Another important benefit from a vapor of homogeneous particles is that it mechanically aids distribution of the fuel during the mixing process and smoothes out the flame front during combustion.

The modern internal combustion engine is well prepared to resist the affects of water on internal surfaces due to the fact of humidity in the atmosphere. Out of necessity, present engine and exhaust system design make use of alloys and materials highly resistant to oxidation.

Submitted also as prior art, this inventor recalls the results and conclusions of three experiments.

1. The trip m.p.g. of a vehicle was established at 14.5 on a 420 mile round trip. Following the first trip, an evaporator type humidifier was installed on the same vehicle connecting the humidifier discharge duct to the air cleaner intake and the same round trip was repeated. The second run m.p.g. was 15.3. Related to the gasoline volume, 27.5 gal., 2.75 qts. of water was consumed or 2.5%. The m.p.g. increase was 5.5%.

The conclusion from the first experiment was that of being a poor economic return.

2. This test involved the use of a container of water through which compressed air was released from the bottom, becoming fully saturated and channeled to the air intake of a vehicle engine. The purpose of the arrangement was to provide a controlled cause and effect where vapors were applied vs. no vapors applied. Repeatedly, the engine speed stabilized at 489 r.p.m. where vapors were admitted and 532 when they were not.

The results of Test 2 were beneficial in final analysis. The only measured result of the test was r.p.m. differential. Since there was a power loss, even though the conditions were exagerated, i.e., very small power demand vs. excessive vapor supply, it was apparent that the vapors displaced, to some degree, needed oxygen.

A conclusion from Test 2 was that if the beneficial effects of water are to be realized in internal combustion, the intended volume of free air must be maintained in addition to the volume of water introduced by raising the density of the combined volume.

3. A vehicle with a history of 15 m.p.g. was outfitted with the following components:

(a) belt driven air pump rated to maintain elevated air pressure throughout the speed range of the engine.

(b) evaporator humidifier with a 3 qt. water storage with fittings to connect flexible ducts from the air pump and to the carburetor air cleaner. The engine air cleaner was adapted to receive air from the humidifier only—the whole system from the air pump being air tight—capable of pressure application. In the following 1036 miles, the vehicle consumed 56 gallons of gasoline (and 9 pints water) or 18.5 m.p.g.

The conclusion of the third experiment is that the conclusions of the second experiment were correct and that it is feasible to develop the learned principles.

SUMMARY OF INVENTION

The present invention is an assembly of specified devices whereby the combustion process in any given engine may be modified, according to the principles of this invention, resulting in a comparable measure of power in a given period but using less fuel and emitting cleaner exhaust gases during that period.

Internal combustion engines exhaust large quantities of heat. The heat that reaches the atmosphere is an unavoidable waste of energy. To use a fraction of heat to expand water in the combustion chamber is, effectively, to make use of some energy waste.

Humidity is the water form used for the purposes of this invention due to it's rapid reaction to heat. The duration of a power stroke in an internal combustion reciprocating engine at 2000 r.p.m. is 0.015 seconds. To complement a power stroke, the water must react in concert with the burning gas.

It is a primary objective of this invention to utilize a portion of the excess heat produced by internal combustion to convert water vapors to steam and hydrogen/oxygen as a tandem contribution to the primary forces therein.

For the above reasons, this invention makes use of evaporation to produce the delicate form of water needed. And, as can be seen, the humidifier will produce a consistant quality and quantity of vapors when properly designed.

Another objective of the present invention is to channel heated air through the air pump, into the humidifier to speed evaporation and increase the humidity factor.

A most important objective of this invention is to provide the means to supply an air circuit, increased in density, to overcome two deficit factors inherent in warm, humid air. The quality of free air is devalued of oxygen related to it's expanded volume when heated, and further by the water volume as relative humidity.

To fulfill the aforesaid objectives, design and rated capacities are objectives in themselves. Basis to rate the components of the invention are worked as up follows:

1. Fix a figure for engine r.p.m. in it's best working range. If the engine is 4 cycle, divide the r.p.m. figure by two.

2. Find engine displacement figure.

3. Convert information 1 and 2 to cubic feet per minute as in this example, 360 CID$\times$(2000 r.p.m.$\div$2)$\div$1728=208 CFM at 0.18 p.s.i. (or 5 in. water pressure). This basis indicates system delivery capacity at the above fixed r.p.m. The drawings show that the air pump is belt driven and the pump speed will coordinate with the engine speed and need for air. The above capacity will need be factored upwards depending upon duct sizing and other factors affecting delivery velocity. A butterfly valve with a locking control is installed in the intake adaption of the air pump expressly to provide a means to fine tune the installed system on an individual engine.

The above work up is not intended to be a formula and, as such, a fixture of this invention. It is instead, an indication of the logic that must prevail to rate the components of this invention to attain the stated principles.

Still another objective of this invention is the practicability of the design and function of the humidifier. Since the cubic units of air passing from the humidifier are under pressure, the relative humidity will not be 100%. But, due to the pressure, a greater passage of air will result and the net water delivery will be related to that of free air at 100% relative humidity at the same temperature.

The humidifier is the largest unit of the invention's components and must be mounted in the vicinity of the engine but need not be affixed thereto. It is important that this unit be located for service access.

The size of the humidifier water storage may be related to other engine service periods, such as fueling. If the capacity is 3% to 5% of the fuel consumed in an operational period, the supply will be adequate. When the system goes dry, no harm will result.

From what is known, the evaporation rate is sufficient in an interior volume, as shown in the drawing, which is that of 1 gal. water storage to service 200/300 CFM air consumption and is 462 cu. in. inside volume.

Construction of the humidifier and cartridge (wick frame) may be of any material that will maintain durability where temperatures vary from −50 degrees F. to 300 degrees F.

The (humidifier) shape may be round or rectangular, but the water storage area sides should angle outward as they rise from the bottom to give relief to ice expansion.

The function of the humidifier dictates that it be of air tight construction, have a removable cover, an inlet adaption arranged to disperse the incoming air into the wick network of the cartridge and an adapter best located to direct the outgoing air through the duct to the carburetor air filter, see drawing FIG. 2.

The humidifier cartridge consists of a frame whereupon type (wicking material such as cotton denim) may be affixed to form a vertically oriented network of wicks. The cartridge shown in the drawings has a top and bottom grill shaped frame integrated by vertical members. The wick tapes are doubled over the grids vertically from top to bottom (see FIG. 3 of the drawing) and may be lapped and fastened. The pattern, as a whole, is planned so that the air will move freely through the lanes being forced to divide itself into narrow, tumbling currents that are exposed time and again to the wet wick faces.

While the whole system is under pressure during operation, velocity of the air stream depends upon the carburetor throttle position. When power is in demand, the air in the top of the humidifier squeezes through the opening 9 in the cover, see FIG. 2 of the drawing. This is the point of greatest pressure, after the air becomes humid and excess water is squeezed out, preventing oversaturation of downstream air.

A variety of structural modes and materials may be used to construct the present humidifier. Novelty is embodied in the principle whereby evaporation is produced by a multiplicity of saturated wicks fed by an integrated storage of water.

In some applications, the water in storage may be heated other than what is shown, if the temperature does not remain above 100 degrees F. during operation. A flow of liquid engine coolant may be circulated through a conductor which intersects the water storage area or by any other well known means to utilize engine heat. However, the storage water temperature should remain below 180 degrees F.

Other variations within the principles of the present invention may include a much higher percentage of water. Should research indicate that preference, the air pump could be located downstream from the humidifier. This arrangement would affect negative pressure through the humidifier, which would increase the velocity, evaporation rate and the water holding capacity of the air. Passing through the pump, the air density would be increased at least by the volume of water therein, and the principles, as they have been stated, would be in effect.

DRAWINGS

Figure 1:
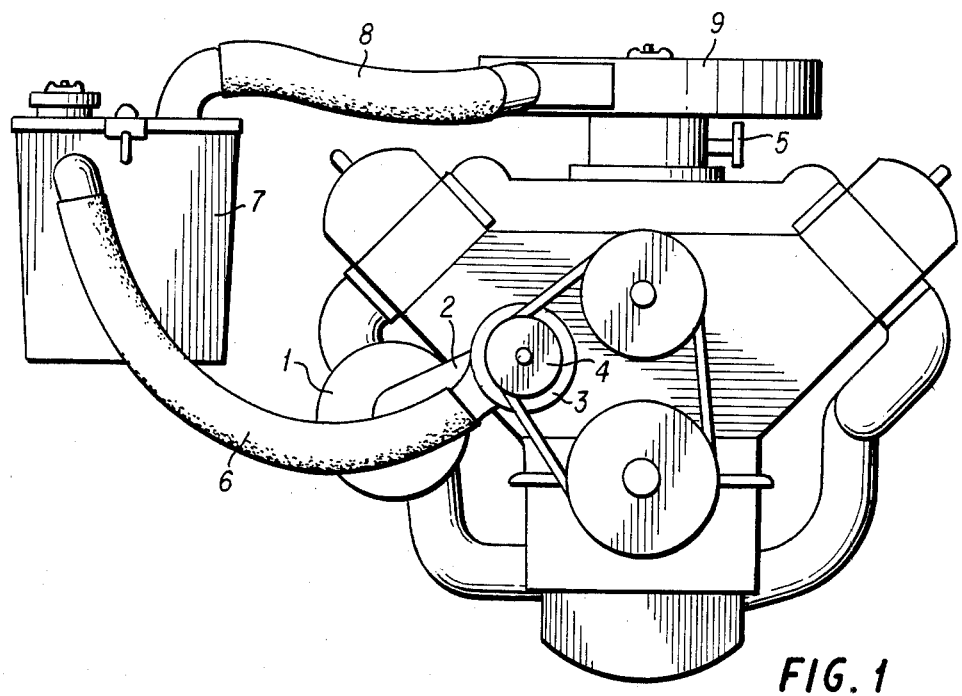
FIG. 1 is a front view of a basic V-8 engine, showing the components of the present invention in one (others possible) arrangement.

As may be seen in FIG. 1 of the drawings, the components of this invention are arranged in a circuit interconnected by tubular ducts to deliver heated, pressurized, (water) saturated air to the engine air intake.

Figure 4:
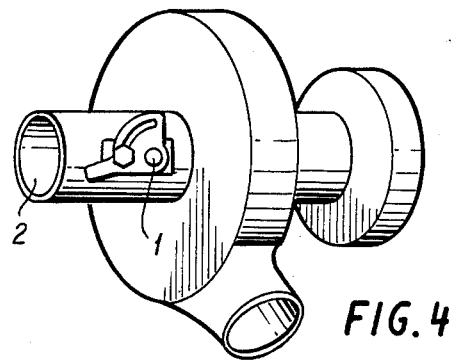
FIG. 4 is a side rear view of a belt driven centrifugal air pump, located in FIG. 1 along line 3, showing a locking control of the fine tune butterfly valve along line 1.

Of FIG. 1, line 1 shows a heat collector of any well known style surrounding one of the two exhaust manifolds which is adapted to a duct, along line 2, that channels heated air into the air pump intake, shown in FIG. 4. The heated air is pressurized by the rated pump as it is driven by a belt pulley, line 4, whereby it's rotational speed relates to the engine speed, as does pressure variation.

FIG. 1 shows the duct 6 leading the airstream to the humidifier where evaporation loads the air with water, after which it is channeled to the intake filter of the engine. The filter, line 9, has been adapted to receive and contain the pressurized air, that being the sole source of air for combustion.

Figure 2:
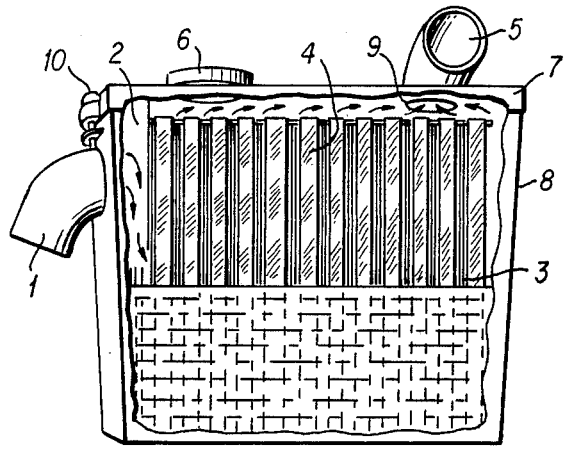
FIG. 2 is a sectional side view of a humidifier of the same type as FIG. 1, but on a larger scale.

FIG. 2 is a cutaway side view showing the parts of a humidifier. Along line 1, the incoming air stream is directed inside the container, where it is forced downward by a baffle, line 2, spaced away from the container wall but fit tightly to the sidewalls to force the air under it's bottom end, as the arrows show, just above the water line, found along line 3. The airstream flows through the wicks of the cartridge, along line 4, a unit whose lower portion is submersed in water and whose upper portion rises to within a space under the humidifier cover, item 7 of FIG. 2. The humid air passes through the outlet, along line 9, and into the adapter, affixed to the cover. The cover (7), as shown, is removable, containing a seal (not shown) located to match the container's (8) top edge and locking screws, 2 each (10), maintain a tight fit. The cover also has a filler cap adaption located along line 6. Not shown, a flexible dip stick may be attached to the under side of the filler cap to provide a method to measure the water in storage and indicate the amount needed to refill.

Figure 3:
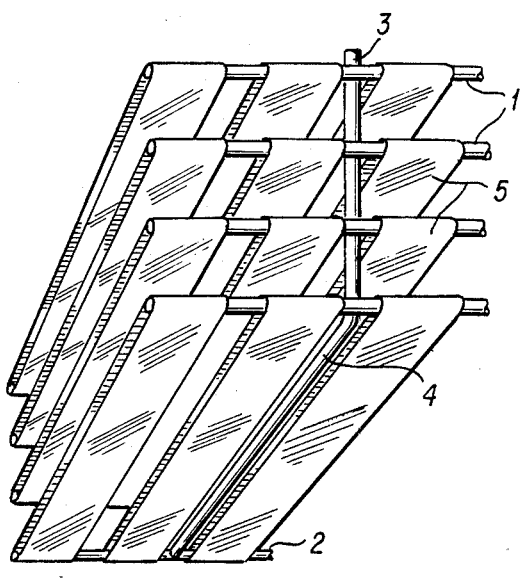
FIG. 3 is an enlarged scale, open partial section of a cartridge, (a humidifier part pointed out in FIG. 2—2) detailing frame structure and wick tape placement.

FIG. 3 is a large scale view of cartridge detail overlooking one corner, showing only twelve assembled wicks. This construction, shown in full view, of an 8"×10" cartridge would have 208 doubled wicks. The parallel members at the top, indicated along lines 1, are matched at the bottom, along line 2. Along lines 3 and 4 are shown, in part, a rectangular framework upon which the members of lines 1 and 2 are fastened. The wick tapes, lines 5, are doubled over as may be seen and fastened, being tight enough to maintain the intended posture and pattern when wet. The rectangular shaped members, indicated in part in FIG. 3, lines 3 and 4, may be as many in number as is needed to structure a sturdy frame.

FIG. 4 is a rear view of an air pump with pulley (front view in FIG. 1 along lines 3 and 4). The pump, rated as discussed in the summary, has a centrifugal impeller, not shown, of design and precision to support pressure and volume as required. Along line 1, a locking control lever is indicated, fastened to the shaft of a butterfly valve located inside the air intake adapter, seen along line 2. The valve and locking control constitute the fine tuning device as is explained in the summary.

I claim:

1. An apparatus for improving the fuel efficiency of an internal combustion engine by increasing the density of humid air supplied to the intake of said engine to insure sufficient oxygen for complete fuel utilization, the apparatus comprising:
    a heater cowl enclosing a specified space around an exhaust manifold of said engine, said space being an air passage into an outlet from said heater cowl in communication with the inlet of;
    a centrifugal air pump which is driven by a v-belt from said engine crankshaft rotation, said pump discharge chamber in communication with the inlet of:
    a humidifier consisting of a body and cover in which lower portion, a water storage for saturating wicks which are attached to a frame suspending said wicks vertically in rows whereby lower portion of said wicks, being submersed, feeding by capillary attraction into upper portion of same extending into an evaporating chamber of upper interior of said body through which an air passage progressing from said humidifier intake, under a dispersing partition into the lanes between said wick rows, into a space above said wicks under said body cover and into an outlet through said cover in communication with the air inlet of said engine, and;
    heating, propelling and humidifying a dense air supply for increasing the efficiency of an internal combustion engine.

2. An apparatus according to claim 1 in thich humid production derive from plain water, mix mechanically with the gases of the atmosphere thereby to preserve the burning characteristics of fuel and oxygen.

3. An apparatus according to claim 2 in which humidifer water storage and function of supply, being prepared for harmless freeze-up wherein:
    said storage container sides angle obtusely from container bottom and absorbent wicks transmit water from said storage to evaporating, thereby a safe water containing apparatus.

4. An apparatus according to claim 1 in which said airstream, propelled by said engine driven air pump, responsive to downstream pressure, thereby being regulated by:
    said engine throttle valve.

* * * * *